United States Patent
Wang et al.

(10) Patent No.: US 11,200,495 B2
(45) Date of Patent: Dec. 14, 2021

(54) PRUNING AND RETRAINING METHOD FOR A CONVOLUTION NEURAL NETWORK

(71) Applicant: Vivante Corporation, San Jose, CA (US)

(72) Inventors: Xin Wang, San Jose, CA (US); Shang-Hung Lin, San Jose, CA (US)

(73) Assignee: Vivante Corporation, San Jose, CA (US)

( * ) Notice: Subject to any disclaimer, the term of this patent is extended or adjusted under 35 U.S.C. 154(b) by 1047 days.

(21) Appl. No.: 15/699,438

(22) Filed: Sep. 8, 2017

(65) Prior Publication Data

US 2019/0080238 A1   Mar. 14, 2019

(51) Int. Cl.
*G06N 3/08* (2006.01)
*G06N 3/04* (2006.01)

(52) U.S. Cl.
CPC .............. *G06N 3/082* (2013.01); *G06N 3/04* (2013.01)

(58) Field of Classification Search
CPC ......... G06N 3/082; G06N 3/04; G06N 3/0454
See application file for complete search history.

(56) References Cited

U.S. PATENT DOCUMENTS

| | | | | |
|---|---|---|---|---|
| 5,636,326 A | * | 6/1997 | Stork | G01N 33/005 706/25 |
| 2016/0358070 A1 | * | 12/2016 | Brothers | G06N 3/0454 |
| 2017/0337471 A1 | * | 11/2017 | Kadav | G06K 9/00771 |
| 2018/0046914 A1 | * | 2/2018 | Li | G06N 3/082 |
| 2018/0046915 A1 | * | 2/2018 | Sun | G06N 3/0445 |
| 2018/0046919 A1 | * | 2/2018 | Li | G06N 3/082 |
| 2019/0050734 A1 | * | 2/2019 | Li | G06N 3/0445 |

OTHER PUBLICATIONS

Network Trimming: A Data-Driven Neuron Pruning Approach towards Efficient Deep Architectures Hu et al. (Year: 2016).*
A pruning based method to learn both weights and connections for LSTM Tang et al. (Year: 2015).*
On-Line Retrainable Neural Networks: Improving the Performance of Neural Networks in Image Analysis Problems (Year: 2000).*
Pruning Filters for Efficient Convnets Li et al. (Year: 2017).*
Pruning Constitutional Neural Networks for Resource Efficient Inference Molchanov et al. (Year: 2017).*
Neurons vs Weights Pruning in Artificial Neural Networks Bondarenko et al. (Year: 2015).*
Pruning algorithms of neural networks—a comparative study Augasta et al. (Year: 2013).*

(Continued)

*Primary Examiner* — Kakali Chaki
*Assistant Examiner* — Ababacar Seck
(74) *Attorney, Agent, or Firm* — David R. Stevens; Stevens Law Group

(57) ABSTRACT

A convolution neural network (CNN) model is trained and pruned at a pruning ratio. The model is then trained and pruned one or more times without constraining the model according to any previous pruning step. The pruning ratio may be increased at each iteration until a pruning target is reached. The model may then be trained again with pruned connections masked. The process of pruning, retraining, and adjusting the pruning ratio may also be repeated one or more times with a different pruning target.

13 Claims, 4 Drawing Sheets

(56) References Cited

OTHER PUBLICATIONS

Network Compression and Speedup Shuochao Yao, Yiwen Xu, Daniel Calzada (Year: 2015).*
Dsd: Dense-Sparse-Dense Training for Deep Neural Networks Han et al. (Year: 2017).*
Learning both Weights and Connections for Efficient Neural Networks Han et al. (Year: 2015).*
Song Han et al. "Learning Both Weights and Connections for Efficient Neural Networks." Oct. 30, 2015.
Sharan Narang et al. "Exploring Sparsity in Recurrent Neural Networks." Arxiv.org. Cornell University Library. Apr. 17, 2017.
Pietro Morerio et al. "Curriculum Dropout." Arxiv.org. Cornell University Library. Mar. 18, 2017.
Steven J. Rennie et al. "Annealed Dropout Training of Deep Networks." 2014 IEEE Spoken Language Technology Workshop. IEEE. Dec. 7, 2014.
Xiaojie Jin, Training Skinny Deep Neural Networks with Iterative Hard Thresholding Methods, Graduate School for Integrative Science and Engineering, NUS, Jul. 19, 2016.

\* cited by examiner

PRUNING AND RETRAINING METHOD FOR A CONVOLUTION NEURAL NETWORK

BACKGROUND

Field of the Invention

This invention relates to systems and methods for performing training a neural network, such as a convolution neural network.

Background of the Invention

Many machine learning applications using Convolutional Neural Networks (CNN) require very high computation and memory bandwidth. One way to reduce computational load is to zero prune the coefficients and skip the computation when a coefficient is zero. Various existing software and hardware optimization techniques take advantage of zero-valued coefficients. One example is the Sparse Matrix Multiplication technique described in *Sparse Convolutional Neural Networks* (Baoyuan Liu, Min Wang1, Hassan Foroosh1, Marshall Tappen, and Marianna Penksy) and *Deep Neural Network Compression and Efficient Inference Engine* (Song Han CVA group, Stanford University, both of which are incorporated herein by reference in their entirety.

CNN s can be pruned by clamping certain connection weights weaker than a threshold to zero. The accuracy is significantly impacted by pruning. Special retraining methods are required to restore pruned model accuracy while maintaining pruned connections. In prior approaches to pruning, a disabling mask is applied to pruned connection weights while retraining. Multi-iteration pruning and retraining usually can help improve accuracy further. But for each iteration, the disabling masks are fixed before retraining.

The systems and methods disclosed herein provide an improved approach for pruning a CNN in order to increase the number of zero coefficients while still achieving high levels of accuracy.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
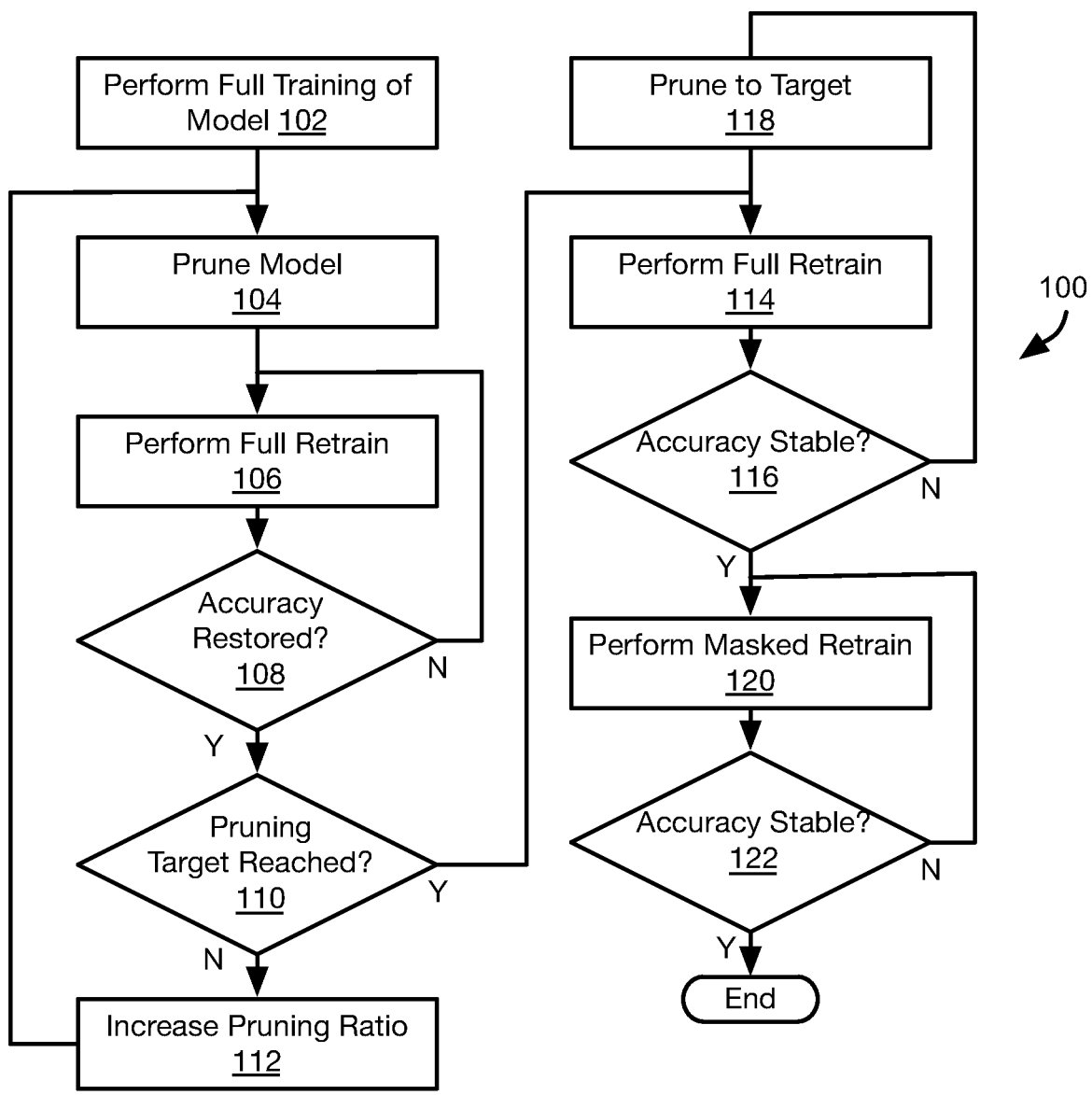
FIG. 1 is a process flow diagram of a method for pruning a neural network in accordance with an embodiment of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized, including non-transitory media. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, the system and methods disclosed herein provide an improved approach for incorporating pruning into the training of a convolution neural network (CNN) in order to increase the number of zero coefficients while still achieving high accuracy.

An example application of a CNN is described in U.S. Application Ser. No. 62/373,518 filed Aug. 11, 2016 and entitled ZERO COEFFICIENT SKIPPING CONVOLUTION NEURAL NETWORK ENGINE; U.S. application Ser. No. 15/671,829, filed Aug. 8, 2017 and entitled ZERO COEFFICIENT SKIPPING CONVOLUTION NEURAL NETWORK ENGINE; and U.S. application Ser. No. 15/671,860 filed Aug. 8, 2017 and entitled ZERO COEFFICIENT SKIPPING CONVOLUTION NEURAL NETWORK ENGINE, all of which are incorporated herein by reference in their entirety.

The illustrated method 100 may be used to train a CNN, other type of neural network, or other type of machine learning model while also pruning connections of the CNN in order to increase the number of zero coefficients. In the following description, a CNN is referred to. However, the methods disclosed shall be understood to be adaptable for use with any type of neural network.

The method 100 may include performing 102 a full training of a CNN model. The full training may include any training method for a CNN known in the art. As known in the art, training 102 may include taking as an input training data and applying a training algorithm in order to set the weights of connections of the CNN model. During a full training, the weight of any connection of the CNN model may be changed in order to produce an accurate output for a given input data based on the training data. As known in the art, training data includes entries each including one or more inputs and one or more desired outputs. The training algorithm selects weights for connections of the CNN such that the model gives the one or more desired outputs upon receiving the one or more inputs. Step 102 may include one or more full retraining iterations, such as by repeating a training algorithm until the accuracy of the CNN model stabilizes, e.g., varies by less than a threshold percentage relative to a previous iteration, e.g. a value between 0.01 and 2 percent, for example 1 percent is an acceptable value.

The method 100 may include pruning 104 the CNN model. This may include clamping the weights of connections that are close to zero to be zero. The pruning step 104 may be performed with a predetermined pruning ratio. The pruning ratio is a percentage of the connections that set to zero. The pruning ratio P may be set to an initial value, e.g., a value between 50 and 60 percent. The pruning step 104 may therefore include clamping the weights to zero for P percent of the connections that have the lowest weights following step 102. Stated differently, the 1−P percent of the connections that are retained will each have higher weights than the pre-pruning weights of all of the P percent of the connections that are clamped to zero.

The method 100 may include performing 106 a full retraining of the CNN model following pruning. The full retraining does not constrain the CNN model according to the pruning step. However, the CNN model at the start of step 106 is the pruned model from step 104. This provides a bias toward the pruned model without constraint to remain in the pruned state. The weights for the pruned connections will therefore be allowed to increase during retraining 106.

Step 106 may be repeated until the accuracy of the CNN model is found 108 to be restored, i.e. to have achieved an accuracy within some threshold percentage (Δ1) of the accuracy of the CNN model following step 102.

The method 100 may include evaluating whether the pruning ratio P is equal to a target pruning ratio $P_T$. Example pruning target ratios may be in the range of 50 and 90 percent. However, what is a reasonable target pruning ratio is highly dependent on the application. If not, the pruning ratio P may be increased to be P+ΔP, where ΔP as an increment amount, or set to $P_T$, whichever is smaller. The increment ΔP may be constant or may vary with each iteration of step 112 according to a non-linear function. The method 100 may then continue at step 104 by pruning the CNN model again with P equal to the value set at step 112. The method may then continue from step 104 as described above.

Once the CNN model has been pruned 104 to the target pruning ratio $P_T$ and retrained 106 to within the threshold accuracy, the method may continue to steps 114, 116, and 118 wherein the CNN model is retrained and pruned 114, 118 one or more times until its accuracy is found 116 to be stable. Stability may be determined to be achieved when the accuracy after one iteration of step 114 is within a threshold difference from a previous iteration, e.g. a value between 0.01 and 2 percent, for example a value of 1 percent is often acceptable.

The method 100 may then include performing 120 a masked retraining of the CNN model. In the masked retraining, only non-zero connections are allowed to change in value. Stated differently, only selected connections are allowed to change at step 120, i.e. those that were not pruned during a last pruning (step 104 or 118).

The masked retraining 120 may include training using a disabling mask according to any masked CNN retraining approach known in the art. Step 120 may be repeated one or more times until the accuracy of the CNN model is found 122 to be stable. Stability may be determined in the same manner as for step 116.

The method 100 may then end and the CNN model may then be used to process production data.

Figure 2:
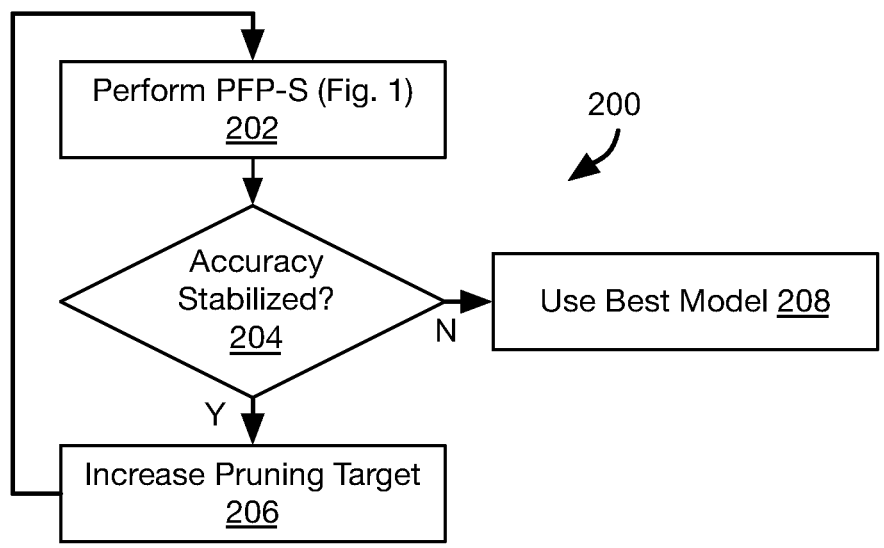
FIG. 2 is a process flow diagram of a method for iteratively performing the method of FIG. 2 in accordance with an embodiment of the present invention.

Referring to FIG. 2, in some embodiment, the method 100 (referred to herein as (prune, full retrain, prune, and selected connection retraining (PFP-S)) may be repeated within the context of the illustrated method 200.

The method 200 may include performing 202 the PFP-S method 100 until the CNN model is found 204 to be stabilized (see step 116). Before the PFP-S method 100 is repeated, the pruning target $P_T$ may be increased, such as by some fixed or variable decrement amount. The initial value of the pruning ratio P may be set to the value of $P_T$ from the prior execution of the PFP-S method 100 or some smaller value.

The CNN model from an iteration of the method 200 may then be used. This may be the CNN model as produced by last iteration of the method 200. Where the increase in the pruning target $P_T$ degrades accuracy of the CNN model by an unacceptable amount, a previous version of the CNN model may be restored at step 208 and used to process production data rather than the latest version of the CNN model.

Figure 3:
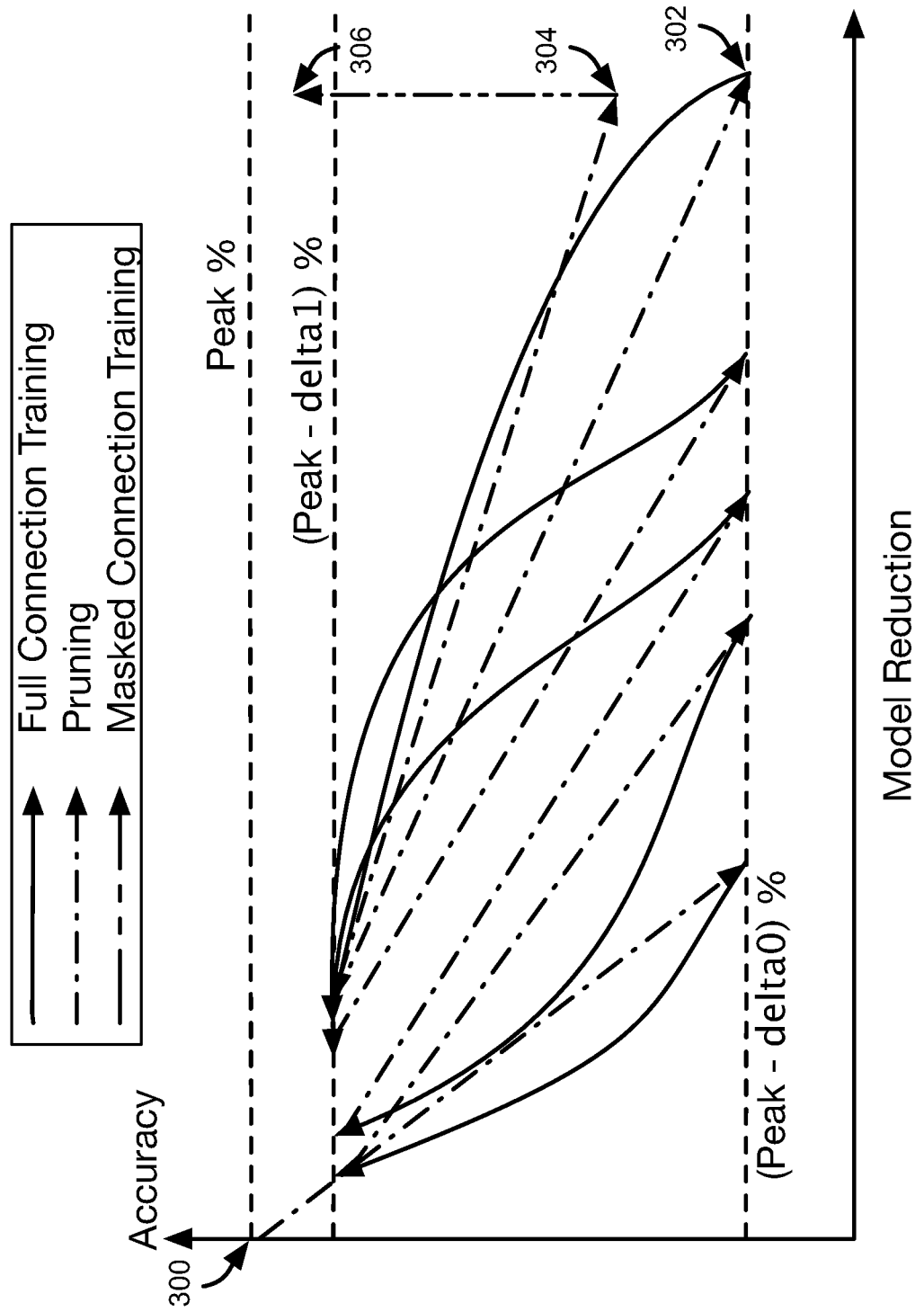
FIG. 3 is a plot illustrating the pruning method of FIG. 1.

FIG. 3 shows an example of how the method 100 may operate. The horizontal axis represents the pruning ratio P. The vertical axis represents the accuracy of the CNN model. Point 300 represents the state of the CNN model following the initial training step 102 of the method 100 having peak accuracy ("Peak %"). As shown in FIG. 3, the CNN model is pruned, resulting in increase in pruning ratio and a reduction in accuracy by a percentage (Peak–Δ0). The CNN model is then trained 106 and pruned 104 repeatedly such that after each training the accuracy reaches Peak–Δ1. Note that during the training step 106, the pruning ratio decreases as pruned connections are allowed to be changed to non-zero values.

Point 302 shows the state of the CNN model after P reaches the pruning target $P_T$. The CNN model may then be retrained 114 and pruned 118 until its accuracy is found 116 to stabilize at which point the CNN model will be at the state shown by point 304 following the last iteration of step 118. The CNN model is then retrained 120 with a mask, which increases the accuracy of the model while retaining the pruning ratio at the pruning target $P_T$. The CNN model will then be at point 306. The method 100 may then be repeated with a different pruning target $P_T$ according to the method 200 or the CNN model may be used to process production data.

Figure 4:
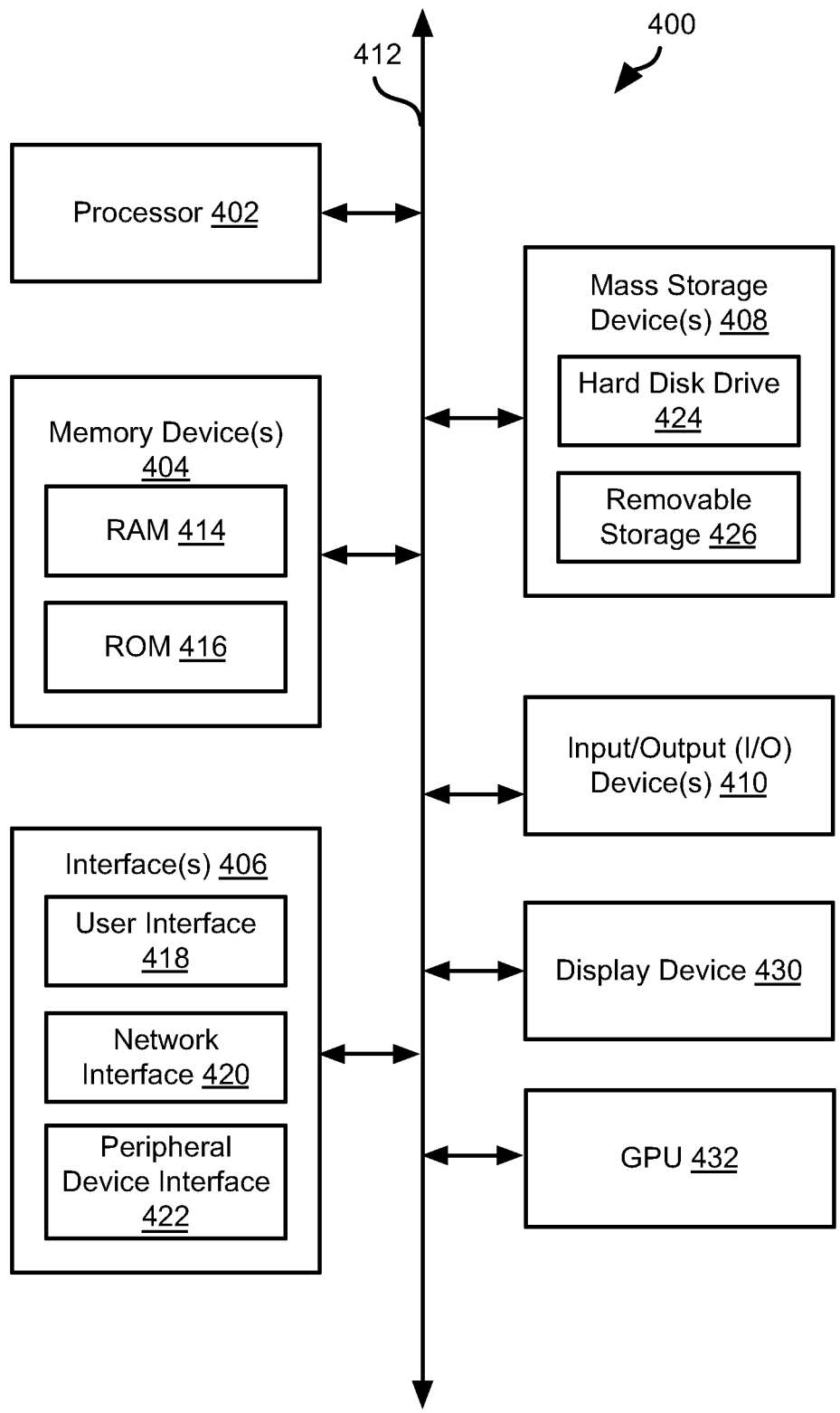
FIG. 4 is a schematic block diagram of a computing device for implementing methods of the invention.

FIG. 4 is a block diagram illustrating an example computing device 400. Computing device 400 may be used to perform various procedures, such as those discussed herein. Computing device 400 can be any of a wide variety of computing devices, such as a desktop computer, a notebook computer, a server computer, a handheld computer, tablet computer and the like.

Computing device 400 includes one or more processor(s) 402, one or more memory device(s) 404, one or more interface(s) 406, one or more mass storage device(s) 408, one or more Input/Output (I/O) device(s) 410, and a display device 430 all of which are coupled to a bus 412. Processor(s) 402 include one or more processors or controllers that execute instructions stored in memory device(s) 404 and/or mass storage device(s) 408. Processor(s) 402 may also include various types of computer-readable media, such as cache memory.

Memory device(s) 404 include various computer-readable media, such as volatile memory (e.g., random access memory (RAM) 414) and/or nonvolatile memory (e.g., read-only memory (ROM) 416). Memory device(s) 404 may also include rewritable ROM, such as Flash memory.

Mass storage device(s) 408 include various computer readable media, such as magnetic tapes, magnetic disks, optical disks, solid-state memory (e.g., Flash memory), and so forth. As shown in FIG. 4, a particular mass storage device is a hard disk drive 424. Various drives may also be included in mass storage device(s) 408 to enable reading from and/or writing to the various computer readable media. Mass storage device(s) 408 include removable media 426 and/or non-removable media.

I/O device(s) 410 include various devices that allow data and/or other information to be input to or retrieved from computing device 400. Example I/O device(s) 410 include cursor control devices, keyboards, keypads, microphones, monitors or other display devices, speakers, printers, network interface cards, modems, lenses, CCDs or other image capture devices, and the like.

Display device 430 includes any type of device capable of displaying information to one or more users of computing device 400. Examples of display device 430 include a monitor, display terminal, video projection device, and the like.

A graphics-processing unit (GPU) 432 may be coupled to the processor(s) 402 and/or to the display device 430. The GPU may be operable to render computer generated images and perform other graphical processing. The GPU may include some or all of the functionality of a general-purpose processor, such as the processor(s) 402. The GPU may also include additional functionality specific to graphics processing. The GPU may include hard-coded and/or hard-wired graphics function related to coordinate transformation, shading, texturing, rasterization, and other functions helpful in rendering a computer generated image.

Interface(s) 406 include various interfaces that allow computing device 400 to interact with other systems, devices, or computing environments. Example interface(s) 406 include any number of different network interfaces 420, such as interfaces to local area networks (LANs), wide area networks (WANs), wireless networks, and the Internet. Other interface(s) include user interface 418 and peripheral device interface 422. The interface(s) 406 may also include one or more user interface elements 418. The interface(s) 406 may also include one or more peripheral interfaces such as interfaces for printers, pointing devices (mice, track pad, etc.), keyboards, and the like.

Bus 412 allows processor(s) 402, memory device(s) 404, interface(s) 406, mass storage device(s) 408, and I/O device(s) 410 to communicate with one another, as well as other devices or components coupled to bus 412. Bus 412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 400, and are executed by processor(s) 402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
   providing a pruning ratio that is a predetermined value;
   (a) training, by a computing device, a neural network;
   (b) pruning, by the computing device, the neural network,
      wherein (b) comprises pruning, by the computing device, the neural network by removing connections in the neural network that have lower weights than remaining connections in the neural network that are not removed such that a number of the remaining connections is at the pruning ratio with respect to a number of possible connections within the neural network;
  (c) retraining, by the computing device, the neural network after performing (b) without imposing any constraint according to the pruning of (b) during the retraining;
  (d) repeating, by the computing device, (b) and (c) such that the retraining of (c) is executed in subsequent iterations without constraint according to the pruning of (b) until an accuracy of the neural network is within a threshold amount below an accuracy of the neural network achieved by performing (a); and
  (e) increasing, by the computing device, the pruning ratio before each iteration of (d).

2. The method of claim 1, further comprising:
  (d) repeating, by the computing device, (b) and (c) one or more times such that the retraining of (c) is executed in subsequent iterations without constraint according to the pruning of (b) in a previous iteration.

3. The method of claim 1, further comprising performing (d) and (e) until (d) is performed with the pruning ratio equal to a target ratio.

4. The method of claim 3, further comprising:
  (f) subsequent to performing (d) and (e) until (d) is performed with the pruning ratio equal to the target ratio, retraining, by the computing device, the neural network with connections pruned at a last iteration of (b) constrained to be weighted to zero.

5. The method of claim 4, further comprising repeating, by the computing device, (a) through (f) one or more times while increasing the target ratio with each repetition of (a) through (f).

6. The method of claim 4, further comprising, subsequent to (e) and prior to performing (f), repeating (d) with the pruning ratio fixed at the target ratio until an accuracy of the neural network achieves a stability threshold condition.

7. The method of claim 1, wherein the neural network is a convolution neural network (CNN).

8. A system comprising one or more processing devices and one or more memory devices, the one or more memory devices storing executable code effective to cause the one or more processing devices to:
  providing a pruning ratio that is a predetermined value;
  (a) train a neural network;
  (b) prune the neural network by removing connections in the neural network that have lower weights than remaining connections in the neural network that are not removed such that a number of the remaining connections is at the pruning ratio with respect to a number of possible connections within the neural network;
  (c) retrain the neural network after performing (b) during the retraining;
  (d) repeat (b) and (c) such that the retraining of (c) is executed in subsequent iterations without constraint according to the pruning of (b) in any previous iteration until an accuracy of the neural network is within a threshold amount below an accuracy of the neural network achieved by performing (a); and
  (e) increase the pruning ratio after each iteration of (d).

9. The system of claim 8, wherein the executable code is further effective to cause the one or more processing devices to perform (d) and (e) until (d) is performed with the pruning ratio equal to a target ratio.

10. The system of claim 9, wherein the executable code is further effective to cause the one or more processing devices to:
  (f) subsequent to performing (d) and (e) until (d) is performed with the pruning ratio equal to the target ratio, retrain the neural network with connections pruned at a last iteration of (b) constrained to be weighted to zero.

11. The system of claim 10, wherein the executable code is further effective to cause the one or more processing devices to:
  repeat (a) through (f) one or more times while increasing the target ratio with each repetition of (a) through (f) until an accuracy of the neural network meets a stability threshold condition.

12. The system of claim 10, wherein the executable code is further effective to cause the one or more processing devices to:
  subsequent to (e) and prior to performing (f), repeat (d) with the pruning ratio fixed at the target ratio until an accuracy of the neural network achieves a stability threshold condition.

13. The system of claim 8, wherein the neural network is a convolution neural network (CNN).

* * * * *